United States Patent [19]

Schröer

[11] 4,130,264
[45] Dec. 19, 1978

[54] EXPANDABLE CORE FOR INJECTION MOLDING

[75] Inventor: Peter Schröer, Ludenscheid, Fed. Rep. of Germany

[73] Assignee: Geyer & Co., Ludenscheid, Fed. Rep. of Germany

[21] Appl. No.: 845,613

[22] Filed: Oct. 26, 1977

[51] Int. Cl.² .................. B28B 7/30; B29C 1/12; B29D 1/00
[52] U.S. Cl. ..................... 249/180; 164/345; 249/59; 249/178; 425/417; 425/DIG. 58
[58] Field of Search ............ 425/330, 556, 417, 468, 425/DIG. 58, 577; 249/59, 63, 178, 122, 152, 180, 184; 164/345

[56] References Cited

U.S. PATENT DOCUMENTS

| | | | |
|---|---|---|---|
| 3,373,460 | 3/1968 | Ladney, Jr. | 425/417 X |
| 3,373,479 | 3/1968 | Watt et al. | 249/59 |
| 3,528,637 | 9/1970 | Bedford, Jr. | 249/180 X |
| 3,660,001 | 5/1972 | Roehr | 249/59 X |

FOREIGN PATENT DOCUMENTS

| | | | |
|---|---|---|---|
| 2049960 | 3/1971 | France | 249/180 |
| 5127708 | 2/1969 | Japan | 249/59 |
| 474395 | 5/1973 | U.S.S.R. | 164/345 |

Primary Examiner—William R. Briggs
Attorney, Agent, or Firm—Spencer & Kaye

[57] ABSTRACT

An expandable core for forming an internal recess in a molded part, composed of a stationary core pin having a generally conical outer surface and a segmented sleeve composed of two groups of lateral slides disposed around the pin with the slides of one group alternating with the slides of the other group. The conicity of the pin outer surface and the slide guidance along the pin are identical for all slides of the same group but are different from one group to the other.

12 Claims, 17 Drawing Figures

EXPANDABLE CORE FOR INJECTION MOLDING

BACKGROUND OF THE INVENTION

The present invention relates to an expandable core for the production of injection molded parts, the core being of the type including a segmented sleeve which is disposed around a stationary core pin and is movable in the axial direction of that core pin, the axially parallel segments of the segmented sleeve being movable radially inwardly from an injection molding state, or position, to an umolding state, or position.

Expandable cores are used for the injection molding of plastic parts which have internal threads, tongues, internal grooves, notches and recesses, as well as perforations and other undercut shapes. During the molding process, the outer surfaces of the segmented sleeves of such a core present mold surfaces for a corresponding inner wall of the injection molded part.

If this inner wall includes undercut portions, or recesses, the segmented sleeve must be brought to a smaller diameter during the unmolding process in order to permit separation of the molded part and the core. Expandable cores of the above-mentioned type achieve this by effecting inward movement, or collapse, of the segments during axial movement of the sleeve along the core pin.

In the known expandable cores this takes place only incompletely.

SUMMARY OF THE INVENTION

It is an object of the present invention to improve the capabilities of such cores.

A further object of the invention is to enlarge the range of uses for expanding cores.

A more specific object of the invention is to provide an expandable core which is structurally simple and which nevertheless permits fully automatic fabrication of injection molded parts with circular as well as rectangular internal cross sections, including those possessing complicated undercut shapes.

These and other objects are achieved according to the present invention by providing the core pin with a generally conical outer surface and by constituting the segmented sleeve of two groups of lateral slides which are continuous in the axial direction and are disposed with the slides of one group alternating with slides of the other group around the pin, the conicity and guidance of these slides along the core pin being identical for the slides belonging to the same group, but different from one group to the other.

Embodiments of the present invention require only a small number of lateral slides. This results in a small space requirement for the guiding devices and thus affords the opportunity of injection molding parts having small diameters. Other than the core pin and the lateral slides, no additional parts are required for the expandable core, particularly no tongue-type head to form the tip of the core.

In embodiments of the present invention, the lateral slides converge in a parallel, radial direction with respect to the core pin when they undergo their axial movement, so that even long undercuts in an injection molded part can be unmolded. Any type of undercut can be unmolded, regardless of whether the molded part has a rectangular or circular cross section, and even angular or lateral undercuts are possible.

As a result of its structure, the expandable core is a fixed unit which permits no burr formation in the plastic part and thus produces very precise results. Due to the immediate inward collapse of the lateral slides during the unmolding process, there is no wear even with extended use of the expandable core. With appropriate selection of materials, the expandable core can be used for thermoplastic processing, duroplastic processing, metal die casting, in a clamping tool and in cutting and stamping machines. The expandable core has no upward limit with regard to its diameter and is less expensive than known expandable cores. It can be used in any type of injection molding machine since it requires no additional attachments or controls.

BRIEF DESCRIPTION OF THE DRAWINGS

FIG. 1b is an axial end view in the direction of arrow Y of FIG. 1a.

FIG. 2b is a view similar to that of FIG. 1b, in the direction of the arrow Y of FIG. 2a.

FIG. 5b is an axial end view in the direction of the arrow Y of FIG. 5a.

FIG. 6a is an elevational, cross-sectional view along the line W—W of FIGS. 6b and 6c, of an embodiment of a core according to the invention in the injection molding state.

FIG. 6b is a cross-sectional view along line X—X of FIG. 6a.

FIG. 6c is an axial end view in the direction of arrow Y of FIG. 6a.

DESCRIPTION OF THE PREFERRED EMBODIMENTS

Figure 1A:
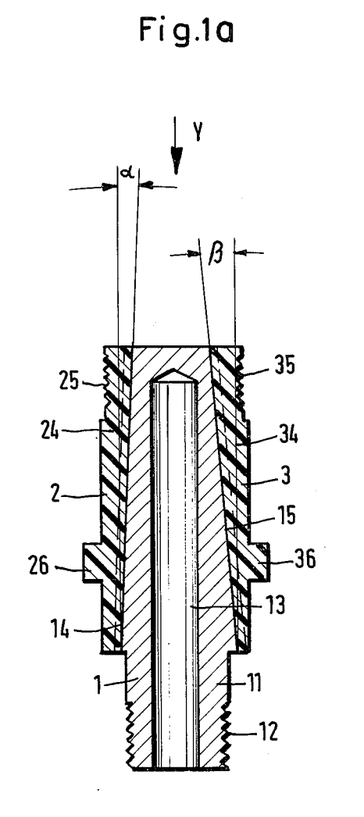
FIG. 1a is a cross-sectional, elevational view, along the line W—W of FIG. 1b, of one preferred embodiment of an expandable core according to the invention, in the injection molding state.
Figure 1B:
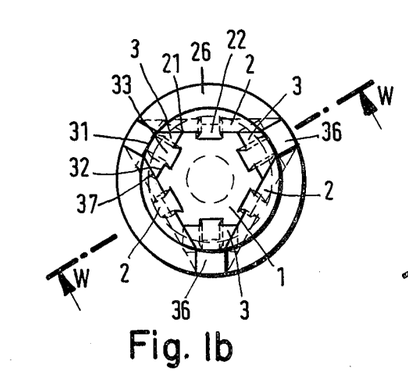
Figure 2A:
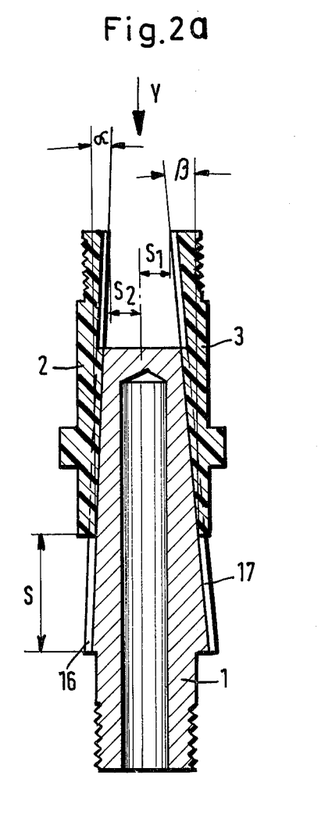
FIG. 2a is a view similar to that of FIG. 1a showing the core in the unmolding state.
Figure 2B:
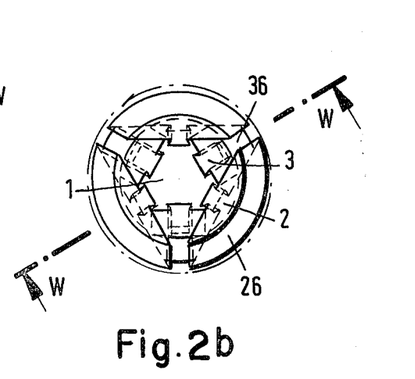
Figure 3:
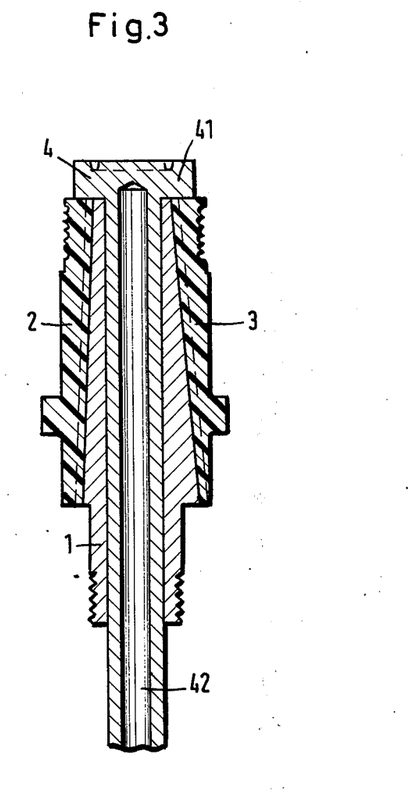
FIG. 3 is a cross-sectional view similar to that of FIG. 1a of an embodiment of an expandable core according to the invention having an additional center core, in the injection molding state.
Figure 4:
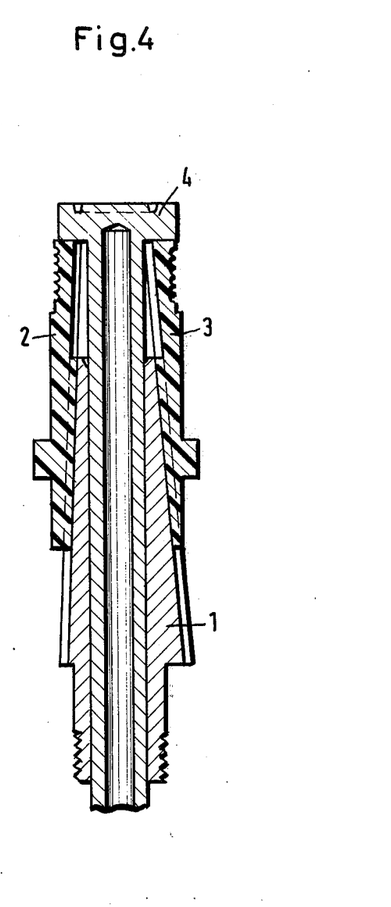
FIG. 4 is a view similar to, and showing the same embodiment as, FIG. 3, in the unmolding state.
Figure 5A:
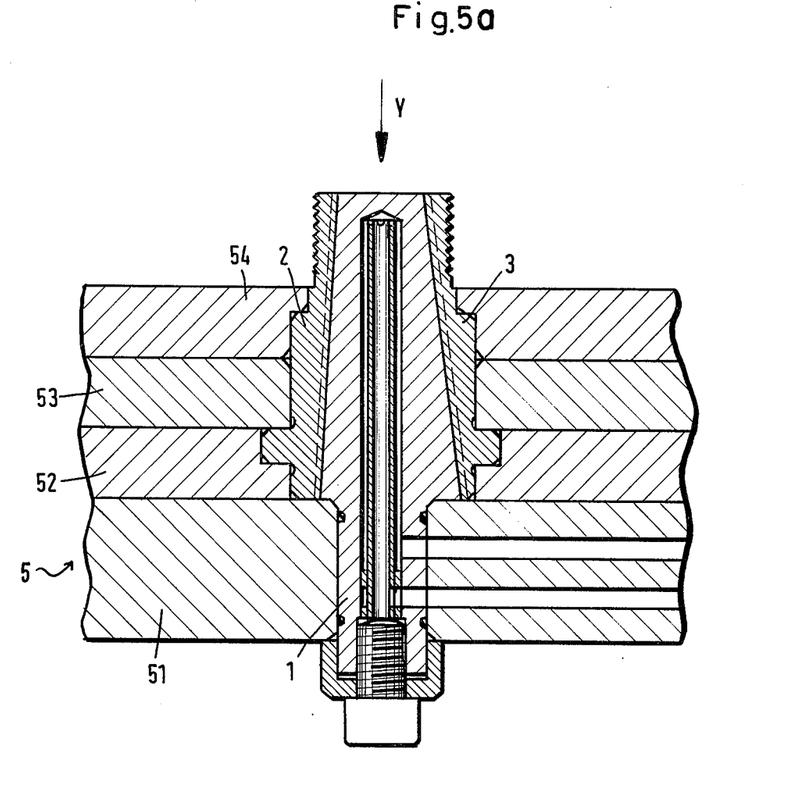
FIG. 5a is an elevational, cross-sectional view of an embodiment of a core according to the invention, in the injection molding state and installed in a molding tool, this view being along the line W—W of FIG. 5b.
Figure 5B:
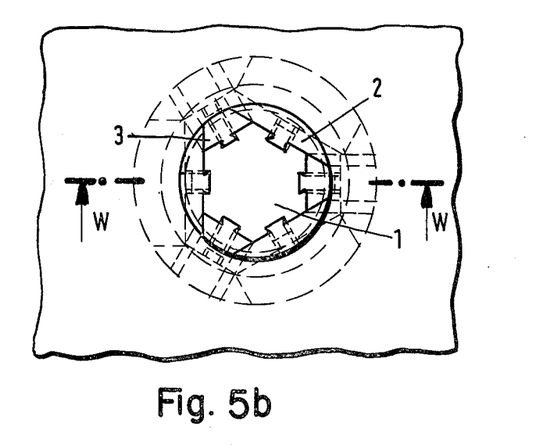

The expandable core according to the invention as shown in FIGS. 1-5 includes a core pin 1 and two groups of lateral slides 2 and 3 arranged around the core pin. All of the lateral slides belonging to the same group are of identical structure. The illustrated embodiment has three slides in each group. Each of the lateral slides 2 alternates with successive lateral slides 3, around the circumference of core pin 1. Core pin 1 may contain an additional center core 4, as shown in FIGS. 3 and 4. One or a plurality of expanding cores are components of a molding tool 5, as shown in FIG. 5.

At its one end, core pin 1 is shaped to constitute a connecting part 11 for making a connection with a stationary part 51 of the molding tool 5. At the free end of connecting part 11, a thread 12 is provided. A central cooling bore 13 passes through substantially the entire core pin 1 from the outer end face of part 11 to the region of the opposite end face of core pin 1.

In the embodiments shown in FIGS. 1 through 5, the core pin 1 is provided with a conical outer surface in the form of a pyramidal frustum having alternating faces 14 and 15 and located beyond connecting part 11. The slope of the faces 15, which is determined by the angle $\beta$ formed with the axis of the pin, is greater than that of faces 14, which is determined by the angle $\alpha$, also formed with the pin axis. In the illustrated embodiment, $\beta$ is about twice as large as $\alpha$.

Slides 2 are mounted to slide along the faces 14, while slides 3 are mounted to slide along the faces 15. In order to hold lateral slides 2 and 3, each of faces 14 and 15 is provided with a dovetail mortise, or groove, 16 or 17, respectively. The faces 14 and 15 and their associated mortises 16 and 17 begin at the fastening member 11 and end at that end face of core pin 1 which is opposite connecting part 11.

Each of the lateral slides 2, which slide along the faces 14 of core pin 1 while being guided in grooves 16, has a cross section which has essentially the shape of a segment of a circle. The chord 21 of each such segment is interrupted by a dovetail tenon, or rib, 22 which engages in its associated groove 16. At its free end, directed away from connecting part 11, each lateral slide 2 is provided with an extension 24 whose outer surface 25 defines the inner wall which is to be formed by the core in the molded part. In the illustrated embodiment the outer surface 25 is provided with parallel grooves.

At a distance from extension 24, each lateral slide 2 is provided with a part 26 of an annular collar with the aid of which the axial movement of the lateral slides 2 within the molding tool 5 is effected.

The lateral slides 3, which slide along the sloping faces 15 of core pin 1 and are guided in grooves 17, have a cross-sectional shape which is essentially that of a trapezoid whose outer base 31 has a curvature which is adapted to the curvature of the circular segments of the lateral slides 2 adjacent thereto. The other, large, base 32 of each slide 3 is interrupted by a dovetail tenon, or rib, 33 with which the lateral slide 3 is guided in an associated groove 17. The lateral sides of each slide 3 which correspond to the nonparallel sides of the trapezoidal cross section contact the surfaces defined by the chords 21 of respective adjacent lateral slides 2.

Each lateral slide 3 is also provided with an extension 34 at its free end directed away from part 11, the outer surface 35 of this extension conforming to the shape of the inner wall of the molded part to be produced. At a distance from the outer surface 35 each lateral slide 3 is also provided with a part 36 of the annular collar. Parts 26 and 36 form the complete annular collar. This collar is provided to effect the axial movement of the lateral slides 2 and 3 within the molding tool 5.

In the embodiment shown in FIGS. 3 and 4, the core pin 1 itself is designed as a hollow body with an open frontal end. The hollow body is filled by the center core 4 which is introduced into the pin via the open frontal end. Head 41 of the center core 4 serves as the mold core and is designed to correspond to the configuration of the recess in the molded piece to be produced. If the core pin 1 is provided with such a center core 4, a cooling bore 42 is advantageously provided within the center core 4 and extends axially into the region of head 41. With this design it is possible to provide, past an undercut, further extensions, e.g. cylindrical extensions, which may also have axial perforations.

The molding tool 5, of which only the machine side is shown in FIGS. 5, is a conventional molding tool having a base plate 51 to which the core pin 1 is screwed, two slide guide plates 52 and 53, and a stripping plate 54. Removal of the core from the molded part is effectuated by moving plate 51 away from plates 52, 53 and 54, thereby causing segments 2 and 3 to move radially inwardly, and by then separating the molded part from the core.

As is readily apparent from a consideration of FIGS. 1a, 1b, 2a and 2b, the slides 2 and 3 are formed such that, aside from the regions of collar parts 26 and 36, the length of chord 21 of each slide 2 and the length of the large base 32 of each slide 3 decreases progressively along the length of pin 1 in the direction toward connecting part 11.

Figures 6A, 6B, 6C:
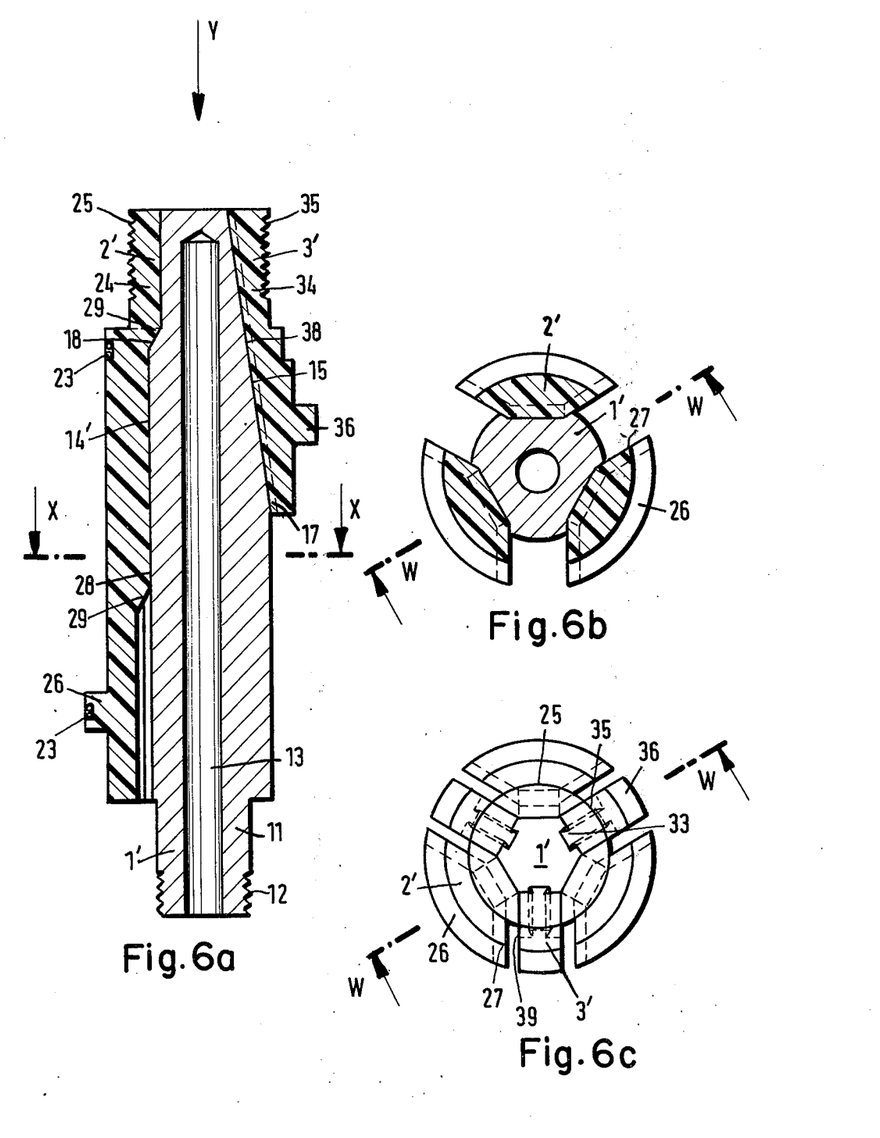
Figure 7A:
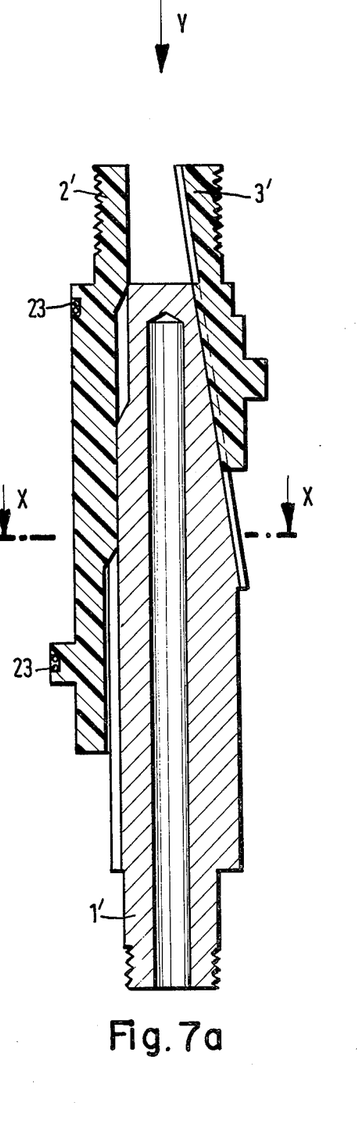
FIGS. 7a, 7b and 7c are views similar to FIGS. 6a, 6b and 6c, showing the core of FIGS. 6 in an intermediate position during unmolding.
Figure 7B:
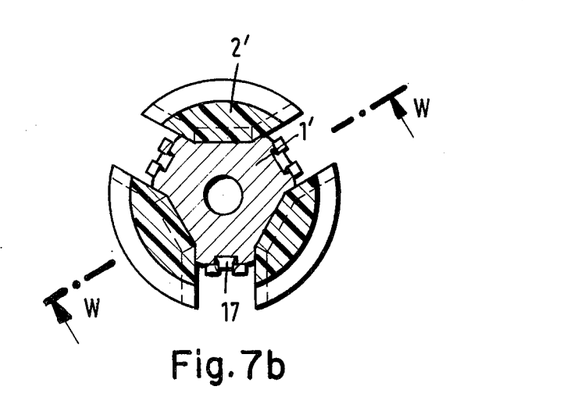
Figure 7C:
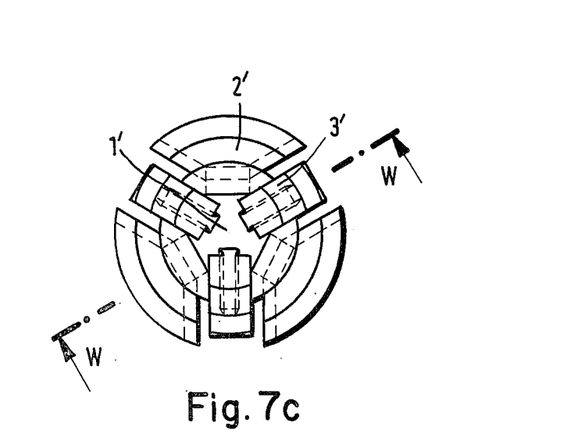
Figure 8A:
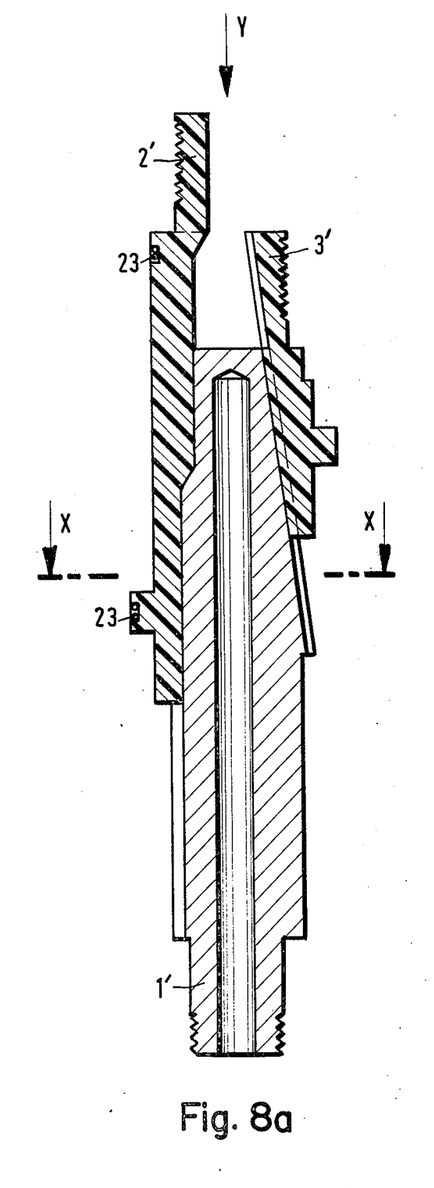
FIGS. 8a, 8b and 8c are views similar to FIGS. 6a, 6b and 6c, respectively, showing the core of FIGS. 6 in the unmolding state.
Figure 8B:
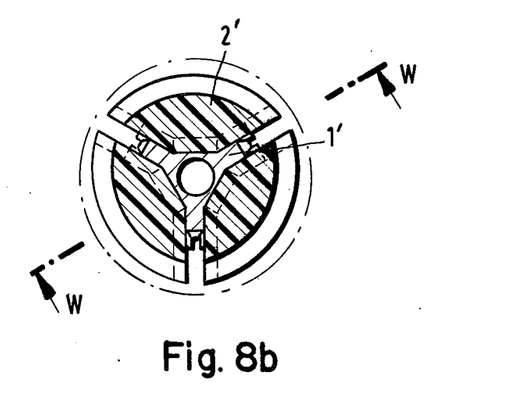
Figure 8C:
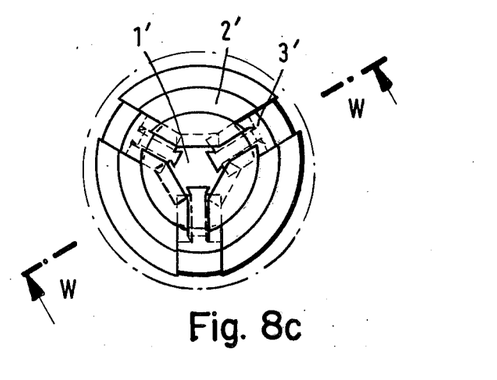

In the embodiment shown in FIGS. 6 to 8, the core pin 1' is provided, following the connecting part 11, with three outer surface portions 14' which are tapered in a stepwise manner toward the free end of the core pin 1'. The outer surface portions 14' are equispaced about the circumference of core pin 1'. Each outer surface portion 14' has a sloped step 18 near the free end of core pin 1 and extends essentially over the entire length of core pin 1, with the exception of the region defined by part 11. Between each two succeeding outer surface portions 14', there is provided an outer surface portion 15 which slopes uniformly inwardly toward the free end of core pin 1. Each outer surface portion 15 is provided in its center with the dovetail mortise 17 which extends in the axial direction. Each surface portion 15 extends axially essentially over half of the length of core pin 1, beginning at its free end, and excluding part 11. In the region between the lower ends of the outer surface portions 15 and the start of the connecting part 11, the core pin is made circular without any particular features.

The lateral slides 2' sliding along the stepped outer surface portions 14' of the core pin 1 are provided with axially parallel inner surfaces 28 which are interrupted by steps 29. These lateral slides have their axially parallel inner surfaces 28 held in contact with the outer surface 14' of the core pin 1 by means of at least two helical springs 23 which enclose the lateral slides 2' in the area of their end faces. One of the helical springs 23 is provided in collar 26. The helical springs 23 advisably are double helixes. Each lateral slide 2' has a cross-sectional shape which is essentially a truncated circular sector.

The lateral slides 3' which slide along the conical outer surface portions 15 of core pin 1 and are guided in grooves 17 each have a sloping inner surface 38. Each lateral slide 3' with its sloping inner surface 38 has a substantially rectangular cross section. The side walls 39 of each lateral slide 3' are parallel to the adjacent side walls 27 of the two lateral slides 2' between which it is disposed, side walls 27 defining parts of the sector-shaped cross section of their associated slides 2' and being spaced from walls 39 in the molding state of FIGS. 6. Each lateral slide 2' is guided in the groove 17 of its associated outer surface portion 15 by means of the dovetail tenon 33.

Each one of the axially parallel outer surface portions 14' of the core pin 1 is provided with a sloping step 18 located at a distance from the free end, i.e. the end remote from part 11, of the core pin equal to the effective length of the mold core. The effective length of the mold core corresponds to the distance to which the core is inserted into the part being molded. Each one of the lateral slides 2' is provided with two sloping steps 29 located at respective distances from the free end of the core pin which are equal to one and three times the effective length of the mold core.

In toto, this embodiment has three lateral slides 2' and three lateral slides 3'. When seen from the top, i.e. as shown in FIG. 6c, the core pin 1 therefore has at its free end substantially the shape of a regular hexagon in which a groove 17 is provided in every alternate face and the intervening faces are flat.

In the molding state, i.e. the state shown in FIGS. 1, 3 and 6, all extensions 24 and 34, and possibly the head 41 of the center core 4, form the mold core for producing an internal wall in the molded part.

The expandable core shown in FIGS. 1 through 5 operates as follows: after opening the mold and removing the molded piece from the nozzle side (not shown), the slide guide plates 52, 53 are moved together with stripping plate 54 upwardly in the axial direction through the distance S shown in FIG. 2a. The slide guide plates 52, 53 are screwed or otherwise secured together and can only travel along path S. Since the core pin 1 is firmly secured to the stationary base plate 51, the lateral slides 2 and 3 which have been carried along via collar 26, 36 also traverse path S. Since the angle $\alpha$ which determines the slope of the outer surface portions 14 is about half as large as the angle $\beta$ which determines the slope of the outer surface portions 15 of core pin 1, the lateral slides 3 not only slide the length of path S in the axial direction, but they also slide inwardly along the surfaces defined by chords 21 on the adjacent lateral slides 2. This permits the lateral slides 2 to move along the conical outer surface portions 14 of core pin 1.

At the end of the axial movement along path S, the inner edges at the free end of the lateral slides 3 have been displaced radially inwardly by a distance which, due to the relationship $\beta = 2\alpha$, is twice as great, with respect to their starting position, as the inward radial displacement of the inner edges at the free end of lateral slides 2. Whereas inner edges of the free ends of slides 2 and 3 are equidistant from the axis of pin 1 in the injection molding state, the distance $S_1$ of the inner edges of lateral slides 3 is less than the distance $S_2$ of the inner edges of the lateral slides 2 in the unmolding state.

After slides 2 and 3 have traversed path S, the molded part is freed from lateral slides 2 and 3 due to their continuously overlapping parallel axial and radial movements toward the inside. The largest outer diameter of the parts of lateral slides 2 and 3 which define the actual mold core is then, in the unmolding state, less than the smallest inner diameter of the recess formed in the molded part. Thus the molded part can be removed from the molding tool by the action of stripping plate 54.

Upon return of the molding tool 5 to its starting position, the lateral slides 2 and 3 slide back along the core pin 1 to their starting positions. A new injection molding process can then be initiated. Here it is of advantage to arrange the molding tool as a multiple tool, i.e. to provide it with a plurality of expandable cores.

In the embodiment shown in FIGS. 6–8, the unmolding movement of the lateral slides 2' and 3' initially causes the lateral slides 2' to be moved parallel to the axis of core pin 1' on the outer surface portions 14', while the lateral slides 3' are moved axially and radially inwardly on the sloping outer surface portions 15. This movement is continued until the rear edge of the portions of slides 2' and 3' which define the recess formed by the core in the molded part is substantially flush with the frontal end face of core pin 1, which position is shown in FIGS. 7a, 7b and 7c. In this position the lateral slides 3' have been moved inwardly to such an extent that the molded part is released from lateral slides 3'. A further axial movement of lateral slides 3' is not required or intended. However, lateral slides 2' continue to move further in the axial direction. This axial movement is continued until that step 29 of each lateral slide 2' which is closer to collar part 26 has reached the level of step 18 in the associated outer surface portion 14 of core pin 1. When this position has been reached, the helical springs 23 press the lateral slides 2' radially inwardly as shown in FIGS. 8a, 8b and 8c. The molded part is thus completely free of the mold core and can be withdrawn from the expandable core with the aid of the associated stripping plate.

As long as the lateral slides 3' have not reached their innermost radial position, which they reach by traveling along outer surface portions 15, the lateral slides 2' cannot be pressed inwardly since both groups of lateral slides 2' and 3' contact one another via adjacent edge surfaces in the region of mold surfaces 25 and 35. Only after the lateral slides 3' have reached the above-mentioned innermost position can lateral slides 2' move radially inwardly during their further axial movement. Thus undercuts measuring up to 25% of the inner diameter of the molded recess can be shaped, since, in their unmolding position, the lateral slides permit unmolding of molded objects having undercuts of such magnitude.

In the unmolding state, the two groups of lateral slides need not have the same axial position with respect to the core pin. Rather, the lateral slides 2' with the stepped inner surfaces can be moved axially beyond the lateral slides 3' with the sloping inner surfaces. For this reason, and in order to realize greater radial movement for the lateral slides with sloping inner surfaces, it is of advantage for the lateral slides 2' with the stepped inner surfaces to be longer than those with the sloping inner surfaces. For example the former could extend along practically the entire length, the latter only over half the length, of the core pin.

It will be understood that the above description of the present invention is susceptible to various modifications, changes and adaptations, and the same are intended to be comprehended within the meaning and range of equivalents of the appended claims.

I claim:

1. In an expandable core device for forming an interior wall in a part being molded and including a core pin and a sleeve composed of a plurality of segments disposed around the pin, the segments being movable axially of the pin and radially inwardly from a molding position to an unmolding position, the improvement wherein: said pin is provided with a conical outer surface defined by a plurality of faces disposed around the periphery of said pin and each having a continuous slope toward the axis of said pin in the direction of axial movement toward the unmolding position; said sleeve is constituted by a group of first lateral slides and a group of second lateral slides, each said slide constituting a respective segment which extends axially of said pin and is movable along a respective face of said outer surface, said first slides alternating with said second slides around the periphery of said pin, and each said slide having a continuously sloping inner surface arranged to cooperate with its associated face; and said conical outer surface faces and said inner surfaces of said slides are formed such that the angle of inclination of said inner surfaces of said second slides and of said pin faces associated therewith, relative to the axis of said pin, is approximately twice that of said inner surfaces of said first slides and of said pin faces associated therewith.

2. An arrangement as defined in claim 1 wherein: each said first lateral slide has a cross section substantially defining a segment of a circle; each said second lateral slide has a cross section substantially defining a trapezoid with an outer base which is adapted to the curvature of the circular segment arcs of said first slides adjacent thereto; and the sides of said second slides corresponding to the nonparallel sides of the trapezoid defined by their cross section are in contact with the chords of the circular segments defined by the cross sections of said first slides adjacent thereto.

3. An arrangement as defined in claim 2 wherein each face of said pin outer surface and its associated slide are together provided with a dovetail joint which guides the movement of said associated slide relative to said pin.

4. An arrangement as defined in claim 1 wherein said core pin is provided with a central cooling bore.

5. An arrangement as defined in claim 2 wherein said core pin comprises a hollow body with an open frontal end face, and a center core extending through said body from the frontal end face thereof.

6. In an expandable core device for forming an interior wall in a part being molded and including a core pin and a sleeve composed of a plurality of segments disposed around the pin, the segments being movable axially of the pin and radially inwardly from a molding position to an unmolding position, the core pin being provided with an outer surface defined by a plurality of faces disposed around the periphery of the pin, the sleeve being constituted by a group of first lateral slides and a group of second lateral slides, each slide constituting a respective segment which extends axially of the pin and is movable along a respective face of the outer surface, and the first slides alternating with the second slides around the periphery of the pin, the improvement wherein: said faces of said outer surface of said core pin include a plurality of first faces each associated with a respective first slide and each provided with a step diposed for reducing the distance between its said face and the axis of said core pin in the direction of axial movement toward the unmolding position, and a plurality of second faces each associated with a respective second slide and having a continuous slope toward the axis of said core pin in the direction of axial movement toward the unmolding position; each said first slide presents axially parallel inner surfaces separated by a step arranged to cooperate with said step in its associated first face; and each said second slide has a sloping inner surface arranged to cooperate with its associated second face.

7. An arrangement as defined in claim 6 wherein each said second face and its associated second slide are together provided with a dovetail joint which guides the movement of said associated second slide relative to said core pin, and further comprising at least two helical springs which enclose said first lateral slides in the area of their end faces for holding said first slides in contact with their associated second faces.

8. An arrangement as defined in claim 6 wherein each said second slide has a substantially rectangular cross section and a radially outer surface conforming, at one end of said device, to the interior wall to be formed by said device, and each said first slide has a cross section in the form of a truncated circular sector whose sides corresponding to circular radii are parallel to the adjacent sides of the rectangles defining the cross sections of said second slides adjacent thereto and is provided at said one end of said device with a portion having a radially outer surface conforming to the interior wall to be formed.

9. An arrangement as defined in claim 6 wherein said second slides are shorter in the axial direction than are said first slides.

10. An arrangement as defined in claim 9 wherein said outer surface of said core pin begins at a free end thereof, said step in each said first face is at a distance from the free end of said core pin which is substantially equal to the length of the interior wall to be formed in the part being molded, and each said first slide presents two steps spaced from the free end of said first slide at distances equal to one time and three times, respectively, the distance between said step in each said first face and the free end of said core pin.

11. An arrangement as defined in claim 6 wherein said conical outer surface of said pin begins at one end thereof and has, at said one end, the form of a regular hexagon each side of which defines one of said faces of said surface, with each said second face being provided with a dovetail tenon and each said first face being smooth.

12. An arrangement as defined in claim 6 wherein the axially parallel inner surfaces of each said first slide are provided with two steps arranged to cooperate with said step in the associated first face.

* * * * *